United States Patent
Katano (10) Patent No.: US 11,654,607 B2
(45) Date of Patent: May 23, 2023

(54) METHOD FOR MANUFACTURING HIGH PRESSURE TANK

(71) Applicant: TOYOTA JIDOSHA KABUSHIKI KAISHA, Toyota (JP)

(72) Inventor: Koji Katano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 37 days.

(21) Appl. No.: 17/341,939

(22) Filed: Jun. 8, 2021

(65) Prior Publication Data

US 2022/0009150 A1 Jan. 13, 2022

(30) Foreign Application Priority Data

Jul. 8, 2020 (JP) .............................. JP2020-117509

(51) Int. Cl.
| | |
|---|---|
| *F17C 1/06* | (2006.01) |
| *B29C 53/60* | (2006.01) |
| *B29C 53/82* | (2006.01) |
| *B29L 31/00* | (2006.01) |

(52) U.S. Cl.
CPC .......... *B29C 53/602* (2013.01); *B29C 53/822* (2013.01); *F17C 1/06* (2013.01); *B29L 2031/7156* (2013.01); *F17C 2209/2163* (2013.01); *F17C 2209/227* (2013.01)

(58) Field of Classification Search
CPC ....................................................... F17C 1/06
See application file for complete search history.

(56) References Cited

U.S. PATENT DOCUMENTS

| | | | |
|---|---|---|---|
| 3,150,219 A | | 9/1964 | Schmidt |
| 3,388,932 A | * | 6/1968 | Bradley ............ B29C 66/52295 156/154 |
| 5,547,533 A | * | 8/1996 | Berglund ............ B29C 66/7212 156/169 |
| 11,298,868 B2 | | 4/2022 | Katano |
| 2012/0234840 A1 | | 9/2012 | Strassburger et al. |

(Continued)

FOREIGN PATENT DOCUMENTS

| | | |
|---|---|---|
| CA | 3011556 A1 | 8/2017 |
| DE | 102015204624 A1 | 9/2016 |

(Continued)

OTHER PUBLICATIONS

Machine Translation of Japanese Patent 2017-110669, Date Unknown.*

(Continued)

*Primary Examiner* — Jeffry H Aftergut
(74) *Attorney, Agent, or Firm* — Finnegan, Henderson, Farabow, Garrett & Dunner, LLP (57) ABSTRACT

A method for manufacturing a high pressure tank includes a step of forming a reinforcing pipe portion including a straight pipe portion and reduced-diameter portions, a step of forming reinforcing dome portions, a step of forming a joined body by joining the reinforcing pipe portion and the reinforcing dome portions, and a step of forming an outer helical layer on an outer face of the joined body. The reinforcing dome portions are disposed with opening ends of the reinforcing dome portions positioned on outer faces of the reduced-diameter portions of the reinforcing pipe portion.

3 Claims, 7 Drawing Sheets

(56) References Cited

U.S. PATENT DOCUMENTS

| | | |
|---|---|---|
| 2020/0158286 A1 | 5/2020 | Criel |
| 2021/0213689 A1* | 7/2021 | Maeda et al. |
| 2021/0237367 A1* | 8/2021 | Takami .................. B29C 70/32 |
| 2022/0032531 A1 | 2/2022 | Katano |
| 2022/0112983 A1 | 4/2022 | Otsubo |

FOREIGN PATENT DOCUMENTS

| | | |
|---|---|---|
| DE | 10 2016 222 674 A1 | 5/2018 |
| DE | 10 2020 126 412 A1 | 7/2021 |
| DE | 10 2020 135 050 A1 | 8/2021 |
| EP | 2 000 288 A1 | 12/2008 |
| EP | 3667152 A1 | 6/2020 |
| JP | 06-510354 A | 11/1994 |
| JP | 2012-149739 A | 8/2012 |
| JP | 2017-110669 A * | 6/2017 |
| JP | 2018-527534 A | 9/2018 |
| JP | 2019-044937 A | 3/2019 |
| JP | 2019-151072 A | 9/2019 |
| WO | WO-91/18239 A1 * | 11/1991 |
| WO | WO 92/20954 A1 | 11/1992 |
| WO | WO 2013/142729 A1 | 9/2013 |
| WO | WO 2017/015536 A1 | 1/2017 |

OTHER PUBLICATIONS

U.S. Appl. No. 17/392,671, filed Aug. 3, 2021.
Office Action issued in U.S. Appl. No. 17/392,671 dated Jun. 3, 2022.
Final Office Action issued in U.S. Appl. No. 17/392,671, dated Nov. 7, 2022.

* cited by examiner

D50max ≤ D60max

D60max<D50max

METHOD FOR MANUFACTURING HIGH PRESSURE TANK

CROSS-REFERENCE TO RELATED APPLICATION

This application claims priority to Japanese Patent Application No. 2020-117509 filed on Jul. 8, 2020, incorporated herein by reference in its entirety.

BACKGROUND

1. Technical Field

The present disclosure relates to a method for manufacturing a high pressure tank.

2. Description of Related Art

Japanese Unexamined Patent Application Publication No. 2012-149739 (JP 2012-149739 A) describes a method for manufacturing a high pressure tank, including a step of forming a reinforcing layer by winding resin-impregnated fiber on an outer face of a liner by filament winding.

SUMMARY

As a new manufacturing method to replace the conventional method, the Inventor of the present disclosure conceived a method in which a pipe portion of a reinforcing layer and dome portions are separately formed, following which these are joined to form a joined body, and an outer helical layer is formed on the outer side of the joined body to form a reinforcing layer. However, the Inventor of the present disclosure found that there is a problem with this new manufacturing method, in that a gap of a considerable size is provided between the pipe portion of the joined body and the outer helical layer, and the strength of the high pressure tank decreases due to this gap.

The present disclosure can be realized as the following aspect.

According to an aspect of the present disclosure, there is provided a method for manufacturing a high pressure tank including a liner that has gas barrier properties, and a reinforcing layer disposed around the liner. The method includes (a) a step of forming a reinforcing pipe portion made of fiber-reinforced resin, the reinforcing pipe portion including a straight pipe portion and reduced-diameter portions that are provided at respective ends of the straight pipe portion and that decrease in outer diameter toward end portions of the reinforcing pipe portion, (b) a step of forming reinforcing dome portions made of fiber-reinforced resin and shaped such that an outer diameter of each of the reinforcing dome portions increases from one end toward an opening end at another end, (c) a step of forming a joined body by disposing the reinforcing dome portions on respective ends of the reinforcing pipe portion such that the opening end of each of the reinforcing dome portions is positioned on an outer face of a corresponding one of the reduced-diameter portions of the reinforcing pipe portion, and joining the reinforcing pipe portion and the reinforcing dome portions, and (d) a step of forming an outer helical layer by performing helical winding of resin-impregnated fiber on an outer face of the joined body, thus forming the reinforcing layer including the reinforcing pipe portion, the reinforcing dome portions, and the outer helical layer. According to this method, the opening ends of the reinforcing dome portions are disposed so as to be positioned on the outer faces of the reduced-diameter portions of the reinforcing pipe portion, and accordingly the possibility of a large gap being formed between the reinforcing pipe portion and the outer helical layer can be reduced as compared to when disposing the opening ends of the reinforcing dome portions so as to be positioned on the outer face of the straight pipe portion of the reinforcing pipe portion, and excessive decrease in strength of the high pressure tank can be suppressed.

In the above method, in the step (b), the reinforcing dome portions may be formed such that a maximum outer diameter of each of the reinforcing dome portions is equal to or smaller than a maximum outer diameter of the reinforcing pipe portion. According to this method, the maximum outer diameter of the reinforcing dome portion is equal to or smaller than the maximum outer diameter of the reinforcing pipe portion, and accordingly the possibility of a large gap being formed between the reinforcing pipe portion and the outer helical layer can be further reduced.

In the above method, the step (c) may include a step of coating resin on a portion that is a gap formed below the outer helical layer at a boundary between the reinforcing pipe portion and each of the reinforcing dome portions in the step (d). According to this method, resin is coated in advance on the portion that forms a gap in the step (d), and accordingly the gap can be made to be even smaller.

In the above method, the step (b) may include (i) a step of forming, on the other end of each of the reinforcing dome portions including the opening end, a thin-walled portion of which a thickness is smaller than other portions of each of the reinforcing dome portions. According to this method, the gap between the reinforcing pipe portion and the outer helical layer can be made to be even smaller by forming the thin-walled portions at the end portions of the reinforcing dome portions.

In the above method, the step (i) may be a step of forming the thin-walled portion by reducing an amount of resin at the other end of each of the reinforcing dome portions. According to this method, the thin-walled portions can be formed by reducing the amount of resin at the end portions of the reinforcing dome portions.

In the above method, the step (b) may include a first step of winding resin-impregnated fiber on a mandrel, and a second step of curing resin of the resin-impregnated fiber wound on the mandrel. The step (i) may be a step of performing curing of the resin in the second step, in a state in which a rubber band is wound onto an outer side of the resin-impregnated fiber at a portion that serves as the other end of each of the reinforcing dome portions. According to this method, the thin-walled portions can be formed by reducing the amount of resin at the end portions of the reinforcing dome portions, by performing curing of the resin in a state in which the rubber band is wound onto the outer side of the resin-impregnated fiber.

Note that the present disclosure can be realized in various forms, and for example, can be realized in the form of a method for manufacturing a reinforcing layer of a high pressure tank.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
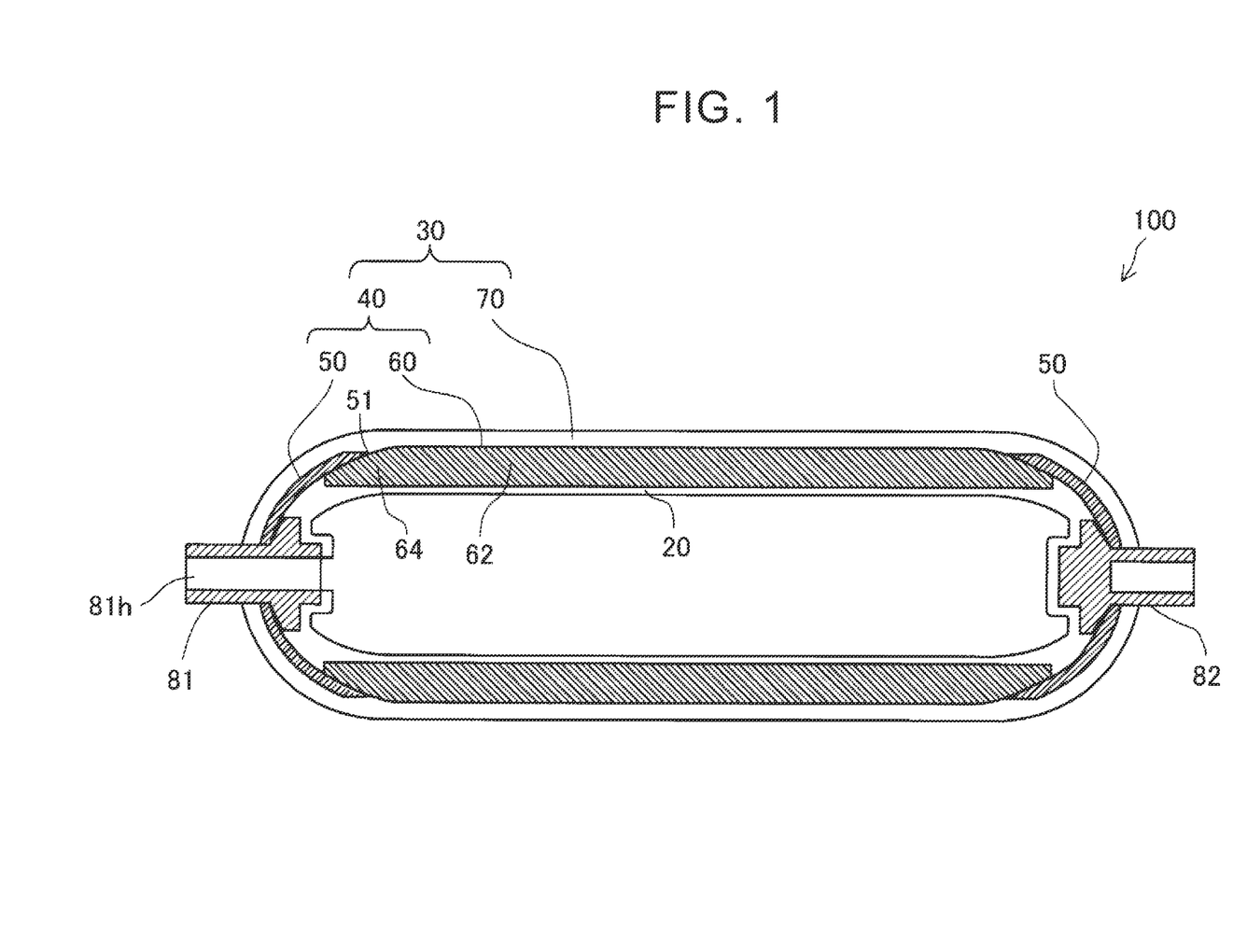
FIG. 1 is a sectional view illustrating a configuration of a high pressure tank according to an embodiment.

FIG. 1 is a sectional view illustrating a configuration of a high pressure tank 100 according to an embodiment. The high pressure tank 100 is a storage container for storing a gas such as hydrogen gas or the like, and is used to store hydrogen to be supplied to a fuel cell for a vehicle or a stationary fuel cell, for example. Generally, high pressure tanks are tanks that store gas at a pressure of 200 kPa or higher in gauge pressure at 20° C. High pressure tanks used for fuel cells typically store hydrogen at a pressure of 30 MPa or higher in gauge pressure at 20° C.

The high pressure tank 100 is provided with a liner 20 that has gas barrier properties, a reinforcing layer 30 disposed around the liner 20, and two necks 81, 82 disposed at respective end portions of the high pressure tank 100. A first neck 81 has a communicating orifice 81h for communicating between the space inside the liner 20 and external space. A connecting device including a valve is provided in this communicating orifice 81h. A second neck 82 does not have a communicating orifice communicating with the external space, but may be provided with a communicating orifice. Alternatively, the second neck 82 may be omitted.

The liner 20 is configured of a resin having gas barrier properties for suppressing transmission of the gas to the outside. Examples of resin that can be used to form the liner 20 include polyamide, polyethylene, ethylene vinyl alcohol copolymer resin (EVOH), polyester, and like thermoplastic resins, and epoxy and like thermosetting resins.

The reinforcing layer 30 is a fiber-reinforced resin layer that reinforces the liner 20, and has a joined body 40 including reinforcing dome portions 50 and a reinforcing pipe portion 60, and an outer helical layer 70. The reinforcing layer 30 may also be referred to as a "reinforcing member". The reinforcing dome portions 50 have so-called domed shapes. More specifically, the reinforcing dome portions 50 have a shape in which the external diameter gradually increases from one end thereof toward an opening end 51 at the other end. The opening ends 51 are, of both ends of the reinforcing dome portions 50, the end portions thereof closer to the center of the high pressure tank 100 in the axial direction of the high pressure tank 100. The ends of the reinforcing dome portions 50 at the opposite sides from the opening ends 51 are in contact with the necks 81, 82, respectively. Although the reinforcing dome portions 50 in the example illustrated in FIG. 1 have shapes obtained by cutting away part of a substantially spherical shape that is hollow, various other shapes may be employed as well. The reinforcing pipe portion 60 has a straight pipe portion 62, and reduced-diameter portions 64 each provided at either end of the straight pipe portion 62. The reduced-diameter portions 64 are formed with the outer diameter reduced toward the end portions of the reinforcing pipe portion 60. Note that the inner diameter of the straight pipe portion 62 and the inner diameter of the reduced-diameter portions 64 are preferably equal. The method of forming the reinforcing dome portions 50 and the reinforcing pipe portion 60 will be described later. The reinforcing dome portions 50 are each disposed on either end of the reinforcing pipe portion 60. The reinforcing dome portions 50 are disposed such that the inner faces thereof come into contact with the outer face of the reinforcing pipe portion 60. Also, the reinforcing dome portions 50 are disposed such that the opening ends 51 of the reinforcing dome portion 50 are situated on the outer faces of the reduced-diameter portions 64 of the reinforcing pipe portion 60 in the present embodiment. The outer helical layer 70 is a layer formed by helically winding resin-impregnated fiber onto the outer face of the joined body 40 including the reinforcing dome portions 50 and the reinforcing pipe portion 60. The primary function of the outer helical layer 70 is to suppress the reinforcing dome portions 50 from coming loose from the reinforcing pipe portion 60 when the inner pressure of the high pressure tank 100 is raised. Hatching of the outer helical layer 70 and the liner 20 is omitted in FIG. 1, for the sake of convenience of illustration.

Examples of resin that can be used to form the reinforcing layer 30 include thermosetting resin such as phenolic resins, melamine resins, urea-formaldehyde resins, epoxy resins, and so forth, with epoxy resins being preferably used in particular, from the perspective of mechanical strength and so forth. Examples of fibers that can be used to form the reinforcing layer 30 include glass fibers, aramid fibers, boron fibers, and carbon fibers. In particular, carbon fibers are preferably used from the perspective of lightness, mechanical strength, and so forth.

Figure 2:
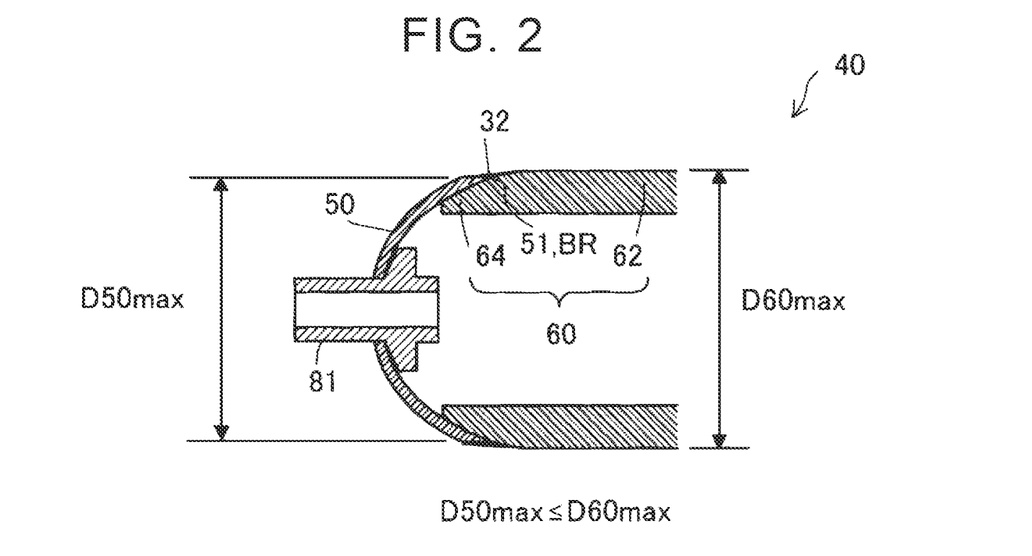
FIG. 2 is a sectional view illustrating a joined body of a reinforcing pipe portion and a reinforcing dome portion according to the embodiment.

FIG. 2 is a sectional view illustrating the joined body 40 according to the present embodiment. Only the left half of the joined body 40 is illustrated in FIG. 2, for sake of convenience of illustration. The joined body 40 includes the reinforcing pipe portion 60 and the reinforcing dome portions 50 each disposed on either end thereof. In the present embodiment, the joined body 40 further includes the necks 81, 82 joined to the reinforcing dome portions 50.

The reinforcing dome portions 50 are disposed such that the opening ends 51 of the reinforcing dome portions 50 are positioned on the outer faces of the reduced-diameter portions 64. Employing such an arrangement enables the possibility of a large gap being formed between the reinforcing pipe portion 60 and the outer helical layer 70 to be reduced as compared to when disposing the opening ends 51 of the reinforcing dome portions 50 so as to be positioned on the outer face of the straight pipe portion 62, and excessive decrease in strength of the high pressure tank 100 can be suppressed.

A further feature of the reinforcing dome portions 50 in the present embodiment is that, with respect to each reinforcing dome portion 50, a maximum outer diameter D50max of the reinforcing dome portion 50 is equal to or smaller than a maximum outer diameter D60max of the reinforcing pipe portion 60. The maximum outer diameter D50max of the reinforcing dome portion 50 is the outer diameter of the reinforcing dome portion 50 at the end portion including the opening end 51. Employing this feature enables the possibility of a large gap being formed between the reinforcing pipe portion 60 and the outer helical layer 70 to be further reduced. Note however, that the maximum outer diameter D50max of the reinforcing dome portion 50 may exceed the maximum outer diameter D60max of the reinforcing pipe portion 60.

Further, in the present embodiment, a resin-filled portion 32 is formed by coating a gap portion, formed below the outer helical layer 70 at a boundary BR between the reinforcing pipe portion 60 and the reinforcing dome portion 50, with resin. The resin forming the resin-filled portion 32 preferably is the same as the resin used for forming the reinforcing layer 30. Forming the resin-filled portion 32 enables the gap between the reinforcing pipe portion 60 and the outer helical layer 70 to be made even smaller.

Figure 3:
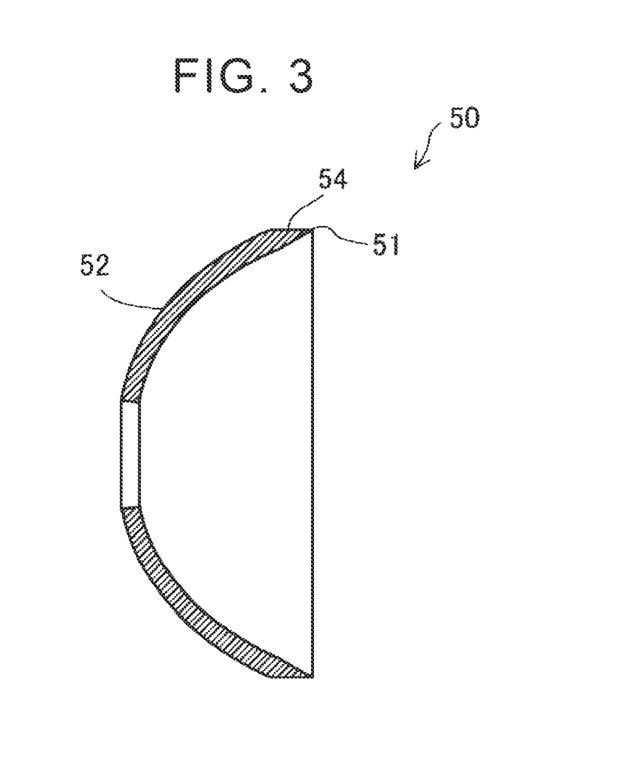
FIG. 3 is a sectional view illustrating a configuration of the reinforcing dome portion.

FIG. 3 is a sectional view illustrating the configuration of the reinforcing dome portion 50. The reinforcing dome portion 50 includes a dome main unit portion 52 and a thin-walled portion 54. The thin-walled portion 54 is formed at the end portion of the reinforcing dome portion 50 including the opening end 51, and is a portion where the thickness thereof is smaller than that of the dome main unit portion 52, which is a portion other than the thin-walled portion 54. The thin-walled portion 54 can be formed as a portion where the amount of resin or the amount of fiber per unit of surface area is smaller than at the dome main unit portion 52. Forming the thin-walled portion 54 at the end portion of the reinforcing dome portion 50 enables the gap between the reinforcing pipe portion 60 and the outer helical layer 70 to be made even smaller. Note that in the present embodiment, the thin-walled portion 54 has a tapered shape in which the thickness gradually becomes smaller the closer to the center of the high pressure tank 100 in the axial direction. This configuration enables the gap between the reinforcing pipe portion 60 and the outer helical layer 70 to be made even smaller. Note however, that the thin-walled portion 54 may be omitted and the entire reinforcing dome portion 50 be made to an approximately uniform thickness.

Figure 4:
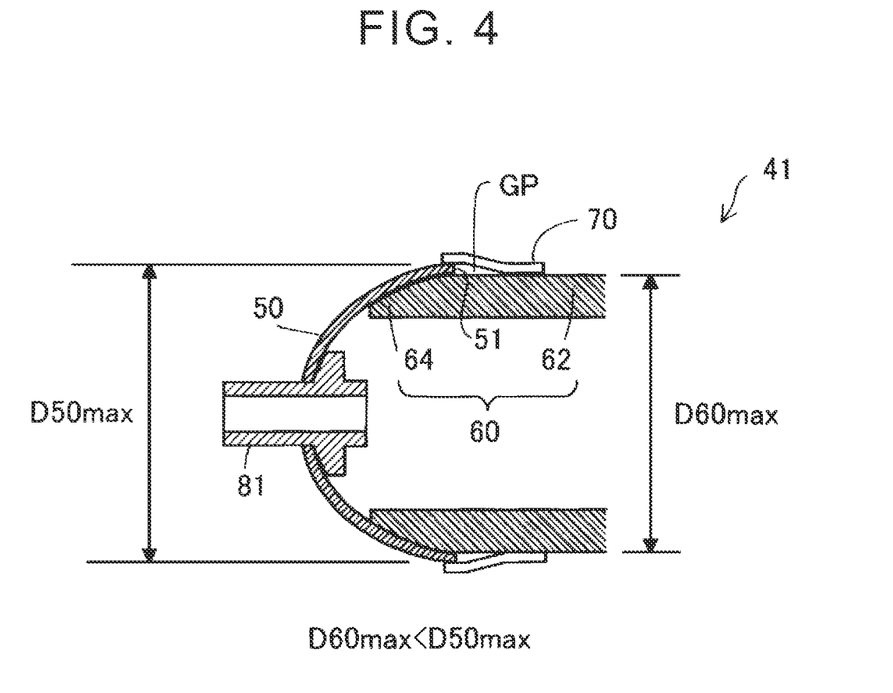
FIG. 4 is a sectional view illustrating a joined body of a reinforcing pipe portion and a reinforcing dome portion according a reference example.

FIG. 4 is a sectional view illustrating a joined body 41 of the reinforcing pipe portion 60 and the reinforcing dome portion 50 according to a reference example. At this joined body 41, the reinforcing dome portion 50 is disposed such that the opening end 51 of the reinforcing dome portion 50 is positioned on the outer face of the straight pipe portion 62 of the reinforcing pipe portion 60. As a result, the maximum outer diameter D50max of the reinforcing dome portion 50 is larger than the maximum outer diameter D60max of the reinforcing pipe portion 60. In this reference example, there is a possibility that a considerably large gap GP will be formed between the reinforcing pipe portion 60 and the outer helical layer 70. Accordingly, the reinforcing dome portion 50 preferably is disposed such that the opening end 51 of the reinforcing dome portion 50 is positioned on the outer face of the reduced-diameter portion 64 of the reinforcing pipe portion 60, as described with reference to FIG. 2. Also, the maximum outer diameter D50max of the reinforcing dome portion 50 is particularly preferably equal to or smaller than the maximum outer diameter D60max of the reinforcing pipe portion 60.

Figure 5:
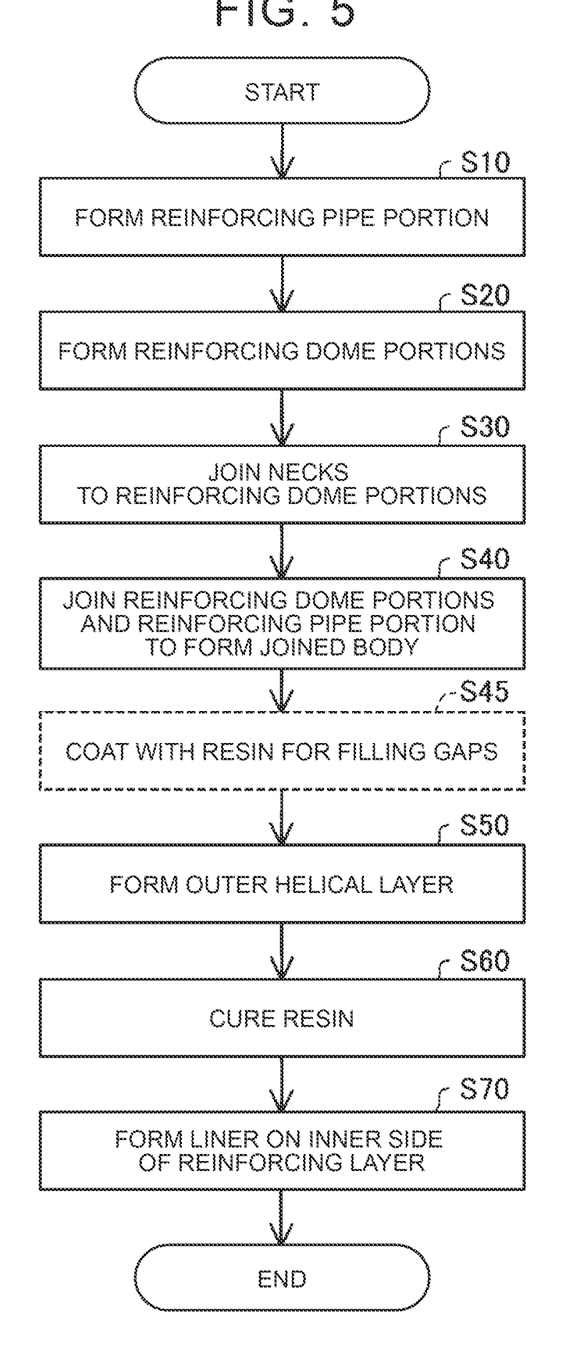
FIG. 5 is a flowchart showing a manufacturing method of the high pressure tank.

FIG. 5 is a flowchart showing a method for manufacturing the high pressure tank 100. Examples of methods used in the following steps will be described later. In step S10 the reinforcing pipe portion 60 is formed. In step S20, the reinforcing dome portions 50 are formed. In step S30, the necks 81, 82 are joined to the reinforcing dome portions 50. In step S40, the two reinforcing dome portions 50 are joined to the respective end portions of the reinforcing pipe portion 60 to form the joined body 40. In step S45, resin for filling gaps is coated on the boundaries between the reinforcing dome portions 50 and the reinforcing pipe portion 60, thereby forming the resin-filled portions 32 described with reference to FIG. 2. Step S45 can be considered to be part of step S40. Alternatively, step S45 may be omitted. In step S50, the outer helical layer 70 is formed on the outer face of the joined body 40. In step S60, the uncured resin of the reinforcing layer 30 is cured. In step S70, the liner 20 is formed on the inner face of the reinforcing layer 30.

Figure 6:
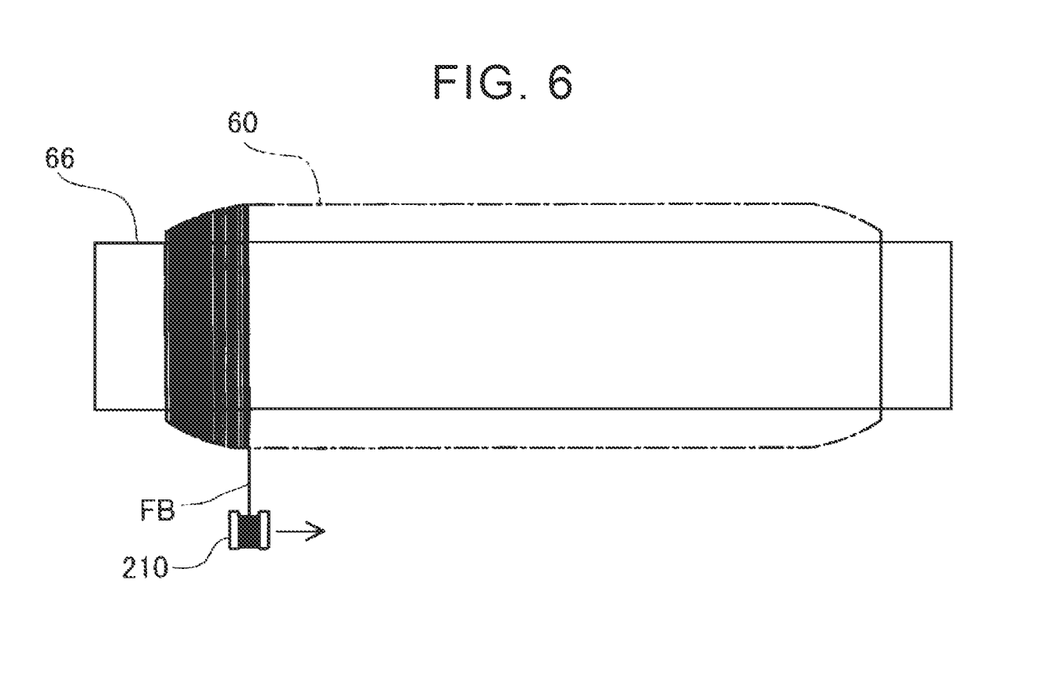
FIG. 6 is an explanatory diagram illustrating an example of a forming method of the reinforcing pipe portion.

FIG. 6 is an explanatory diagram illustrating an example of a method of forming the reinforcing pipe portion 60 in step S10 of FIG. 5. The reinforcing pipe portion 60 can be formed using filament winding, by winding a fiber bundle FB on a substantially cylindrical mandrel 66. In filament winding, the fiber bundle FB is wound on the mandrel 66 by moving a fiber bundle guide 210 while rotating the mandrel 66. The example in FIG. 6 shows the fiber bundle FB being wound by hoop winding, but helical winding may be used. For the filament winding (FW) method, one of wet FW and dry FW described below can be used.

There generally are the following methods as typical methods for forming objects of fiber-reinforced resin.

Wet FW

Wet FW is a method in which the fiber bundle FB is impregnated with liquified resin of which the viscosity has been lowered, immediately before winding the fiber bundle FB, and the resin-impregnated fiber bundle is wound onto a mandrel.

Dry FW

Dry FW is a method in which a tow prepreg, obtained by impregnating a fiber bundle with resin and then drying in advance, is prepared, and the tow prepreg is wound onto a mandrel.

Resin Transfer Molding (RTM)

RTM is a method of molding in which fiber is set in a pair of male and female molds, the mold is closed, and thereafter resin is poured in from a resin inlet, thereby impregnating the fiber.

Centrifugal Winding (CW)

CW is a method in which a cylindrical member is formed, by applying a fiber sheet on an inner face of a rotating cylindrical mold. For the fiber sheet, a fiber sheet that has been impregnated with resin in advance may be used, or a fiber sheet that has not been impregnated with resin may be used. When employing the latter, resin is poured into the mold after cylindrically winding the fiber sheet, and the fiber sheet is thus impregnated with the resin.

Although filament winding is used to form the reinforcing pipe portion 60 in the example in FIG. 6 described above, the reinforcing pipe portion 60 may be formed using other methods, such as RTM. Curing of the resin of the reinforcing pipe portion 60 may be performed in step S10, or may be performed in step S60.

When performing curing of the resin of the reinforcing pipe portion 60 in step S10, main curing, in which curing is performed completely until the viscosity of the resin is in a stable state at a target value thereof or higher, may be performed. Alternatively, preliminary curing in which main curing is not attained may be performed. Generally, uncured thermosetting resin initially exhibits lower viscosity upon being heated, and when heating is continued thereafter, the viscosity rises. By continuing heating for a sufficient amount of time, the viscosity of the resin is in a stable state at the target value thereof or higher. Assuming such a process, processing in which curing is continued even after the viscosity drops and then rises and returns to the initial viscosity and curing is stopped at any point before reaching the final point of the main curing, will be referred to as "preliminary curing". By performing preliminary curing in step S10 and then performing main curing in the later-described step S60, the reinforcing pipe portion 60 can be more powerfully joined to the reinforcing dome portions 50 and the outer helical layer 70.

Note that in order to facilitate separation of the mandrel 66 and the reinforcing pipe portion 60, the mandrel 66 may be dividable. When separation of the mandrel 66 and the reinforcing pipe portion 60 is difficult even though the mandrel 66 is dividable, two divided members in which the whole reinforcing pipe portion 60 is divided into two at the general middle may be individually formed, and the two divided members may be joined to form the reinforcing pipe portion 60.

Figure 7:
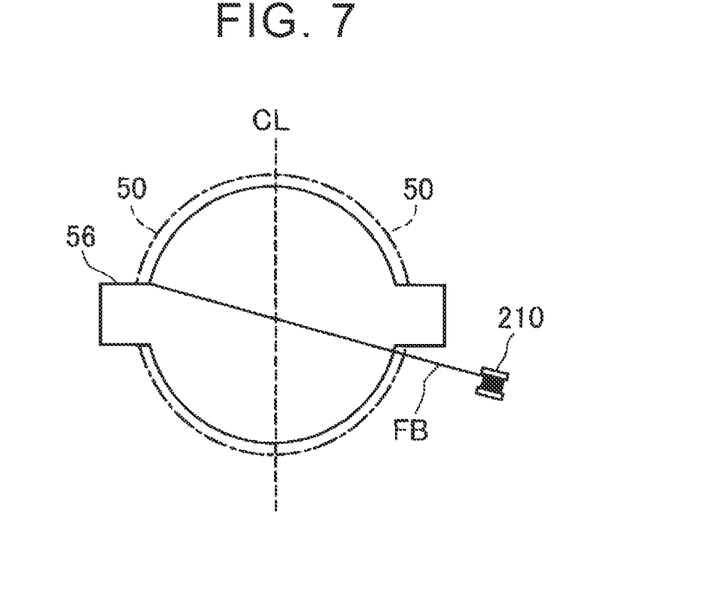
FIG. 7 is an explanatory diagram illustrating an example of a forming method of the reinforcing dome portion.

FIG. 7 is an explanatory diagram illustrating an example of a method of forming the reinforcing dome portions 50 in step S20 in FIG. 5. The reinforcing dome portions 50 can be formed by winding the fiber bundle FB onto a mandrel 56 using filament winding. The mandrel 56 preferably has an external shape of two reinforcing dome portions 50 put together. In filament winding, the fiber bundle FB is wound into the mandrel 56 by moving the fiber bundle guide 210 while rotating the mandrel 56. In the example in FIG. 7, the fiber bundle FB is being wound by helical winding. Either of the above-described wet FW and dry FW may be used for filament winding. After winding of the fiber bundle FB ends, the two reinforcing dome portions 50 can be obtained by cutting along a cutting line CL. Note that the reinforcing dome portions 50 may be formed using other methods such as RTM.

Figure 8:
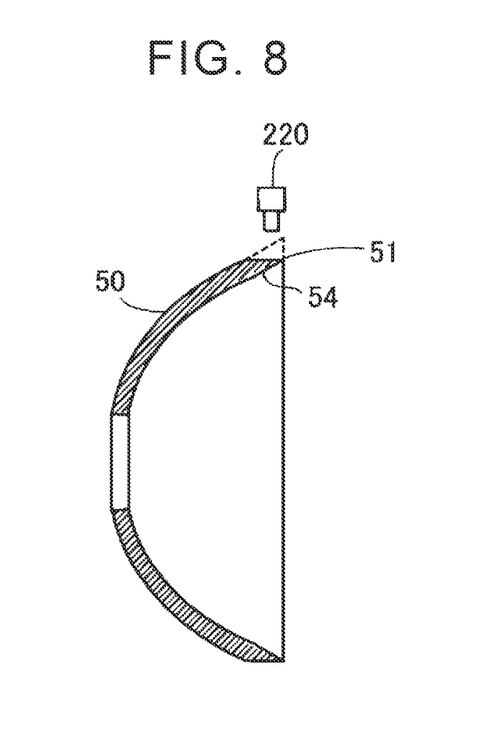
FIG. 8 is an explanatory diagram illustrating an example of a method of reducing resin at an end portion of the reinforcing dome portion.

FIG. 8 is an explanatory diagram illustrating an example of a method to reduce the amount of resin at the end portion of each reinforcing dome portion 50. The thin-walled portion 54 is preferably formed at the end portion including the opening end 51 of the reinforcing dome portion 50, as described with reference to FIG. 3. In this case, uncured resin at the portions to become the thin-walled portion 54 may be removed by suctioning with a suctioning device 220 to form the thin-walled portion 54. Thus, the thin-walled portion 54 can be formed by reducing the amount of resin at the end portions of the reinforcing dome portion 50. Note that for tools to remove the resin, rollers, doctor blades, or other such removal tools may be used instead of the suctioning device 220. When reducing the amount of resin from the portions to become the thin-walled portion 54, the above-described wet FW is preferably used. Alternatively, in the above-described dry FW, the tow prepreg wound on the mandrel 56 may be heated and removal of the uncured resin be performed in a state in which the viscosity of the resin is lowered.

Figure 9:
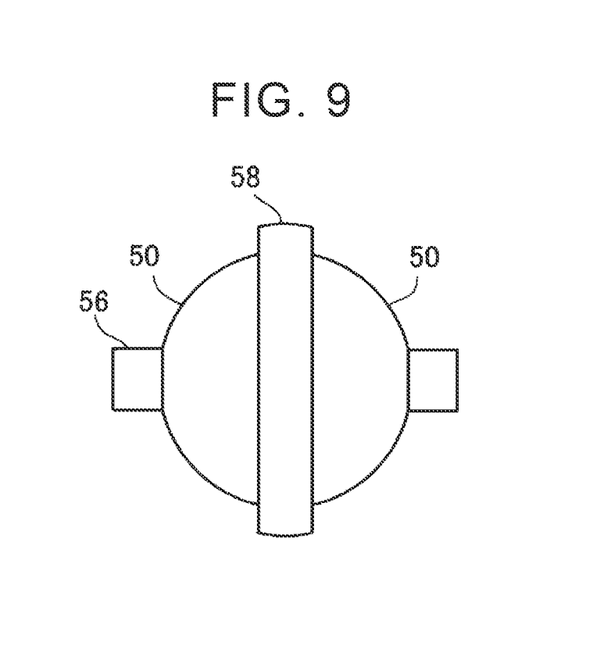
FIG. 9 is an explanatory diagram illustrating another example of a method of reducing resin at the end portion of the reinforcing dome portion.

FIG. 9 is an explanatory diagram illustrating another example of a method to reduce the amount of resin at the end portion of the reinforcing dome portion 50. In this method, following a first step of winding resin-impregnated fiber on the mandrel 56, a second step of curing the resin of the resin-impregnated fiber wound on the mandrel 56 is performed. In this second step, curing of the resin is performed in a state in which a rubber band 58 is wound onto the outer side of the resin-impregnated fiber at the portion that is to become the thin-walled portion 54 at the end portion of the reinforcing dome portion 50, as illustrated in FIG. 9. At this time, the rubber band 58 is wound under tension. According to this method, resin beneath the rubber band 58 is pressed out, and accordingly the amount of resin at the end portion of the reinforcing dome portion 50 can be reduced and the thin-walled portion 54 can be formed. When employing this method, either of the above-described wet FW and dry FW may be employed. Also, main curing may be performed for the curing of resin in the second step, or preliminary curing may be performed.

Also note that the curing of the resin of the reinforcing dome portions 50 may be performed in step S20, or may be performed in step S60. When performing curing of the reinforcing dome portions 50 in step S20 in FIG. 5, curing may be performed sequentially from the middle portion of the mandrel 56 illustrated in FIG. 7 toward both ends. Accordingly, the amount of resin at the end portions of the two reinforcing dome portions 50 is smaller than at the other portions, and the thin-walled portions 54 can be formed without performing removal of resin such as illustrated in FIGS. 8 and 9. For the curing of resin at this time, main curing may be performed, or preliminary curing may be performed. Performing preliminary curing in step S20, and performing main curing in later-described step S60 enables the reinforcing dome portions 50 to be joined to the reinforcing pipe portion 60 and the outer helical layer 70 more powerfully.

In step S30 in FIG. 5, the reinforcing dome portions 50 and the necks 81, 82 are joined. In step S40, the reinforcing pipe portion 60 is further joined to the joined bodies formed in step S30, thereby forming the joined body 40 illustrated in FIG. 2. The joining in steps S30 and S40 may be performed using an adhesive agent or pressure-sensitive adhesive, for example. The resin-filled portion 32 described with reference to FIG. 2 is formed in step S45 in FIG. 5.

Figure 10:
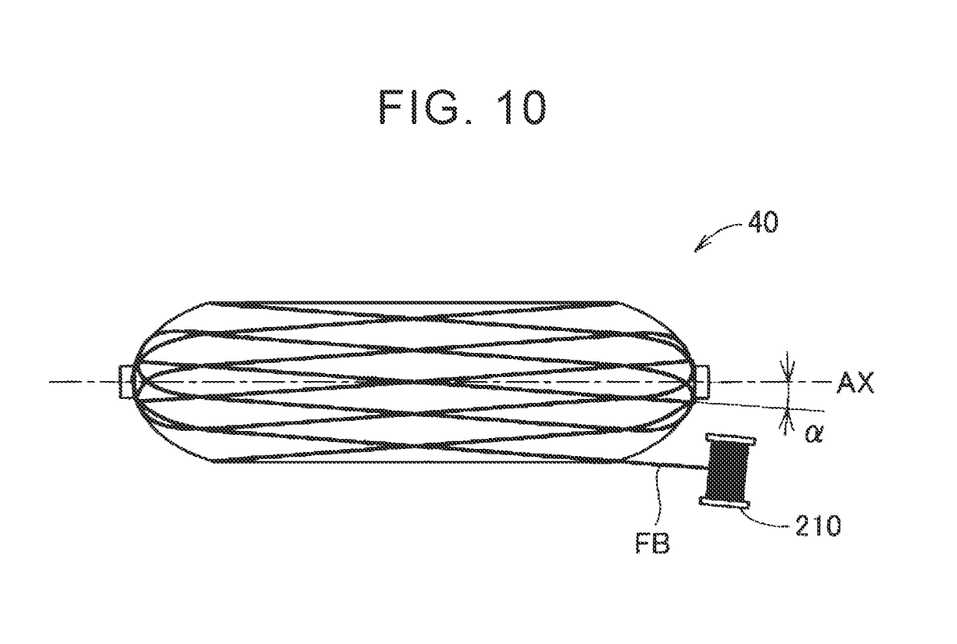
FIG. 10 is an explanatory diagram illustrating a method of forming an outer helical layer.

FIG. 10 is an explanatory diagram illustrating a method of forming the outer helical layer 70 in step S50 in FIG. 5. The outer helical layer 70 can be formed by winding the fiber bundle FB onto the outer face of the joined body 40 using filament winding. In filament winding, the fiber bundle FB is wound onto the joined body 40 by moving the fiber bundle guide 210 while rotating the joined body 40 about a center axis AX. Either of wet FW or dry FW can be used for filament winding. As described above, the primary function of the outer helical layer 70 is to prevent the reinforcing dome portions 50 from coming loose from the reinforcing pipe portion 60 when the inner pressure of the high pressure tank 100 is raised. In order to achieve this function, a winding angle α of the fiber bundle FB preferably is no greater than 45 degrees. The winding angle α is the angle of the fiber bundle FB as to the center axis AX of the joined body 40.

In step S60 in FIG. 5, uncured resin of the reinforcing layer 30 is cured. This curing is the main curing described with reference to FIG. 6. In step S70, the liner 20 is formed on the inner face of the reinforcing layer 30 following curing. Formation of the liner in step S70 can be performed by putting a liquid liner material inside the reinforcing layer 30 provided with necks, and curing the liner material while rotating the reinforcing layer 30, for example. Thus, when formation of the liner 20 ends, the high pressure tank 100 illustrated in FIG. 1 is complete.

Note that the liner 20 may be formed in a step other than step S70 in FIG. 5. For example, the liner 20 may be formed separately from the reinforcing dome portions 50 and the reinforcing pipe portion 60, with the liner 20 and the two reinforcing dome portions 50 and necks 81, 82 being joined thereafter in the above-described step S30. In this case, formation of the liner 20 may be performed by injection molding, for example. At this time, two divided members in which the whole liner 20 is divided into two at the general middle may be formed separately by injection molding, and the two divided members removed from the injection-molding molds may be joined to form the liner 20. At the time of this molding, the necks 81, 82 may be placed inside the injection-molding molds, and the necks 81, 82 and the divided members of the liner 20 may be joined by insert molding. Alternatively, the necks 81, 82 may be joined to the two respective divided members of the liner 20 after the divided members are removed from the molds.

As described above, in the present embodiment, the opening ends 51 of the reinforcing dome portions 50 are disposed so as to be placed on the outer faces of the reduced-diameter portions 64 of the reinforcing pipe portion 60. As a result, the possibility of a large gap being formed between the reinforcing pipe portion 60 and the outer helical layer 70 can be reduced as compared to when disposing the opening ends 51 of the reinforcing dome portions 50 so as to be positioned on the outer face of the straight pipe portion 62 of the reinforcing pipe portion 60, and excessive decrease in strength of the high pressure tank 100 can be suppressed.

The present disclosure is not limited to the above-described embodiment and modifications thereof, and can be realized through various configurations without departing from the essence thereof. For example, the technical features of the embodiment and modifications thereof corresponding to the technical features of the aspects described in the SUMMARY may be substituted or combined as appropriate, in order to solve part or all of the above-described problems, or to achieve part or all of the above-described advantages. The technical features can also be omitted as appropriate, as long as they are not described as being indispensable in the present specification.

What is claimed is:

1. A method for manufacturing a high pressure tank including a liner that has gas barrier properties, and a reinforcing layer disposed around the liner, the method comprising:
  (a) a step of forming a reinforcing pipe portion made of fiber-reinforced resin, the reinforcing pipe portion including a straight pipe portion and reduced-diameter portions that are provided at respective ends of the straight pipe portion and that decrease in outer diameter toward end portions of the reinforcing pipe portion;
  (b) a step of forming reinforcing dome portions made of fiber-reinforced resin and shaped such that an outer diameter of each of the reinforcing dome portions increases from one end toward an opening end at another end;
  (c) a step of forming a joined body by disposing the reinforcing dome portions on respective ends of the reinforcing pipe portion such that the opening end of each of the reinforcing dome portions is positioned on an outer face of a corresponding one of the reduced-diameter portions of the reinforcing pipe portion, and joining the reinforcing pipe portion and the reinforcing dome portions; and
  (d) a step of forming an outer helical layer by performing helical winding of resin-impregnated fiber on an outer face of the joined body, thus forming the reinforcing layer including the reinforcing pipe portion, the reinforcing dome portions, and the outer helical layer, wherein
  the step (b) includes (i) a step of forming, on the other end of each of the reinforcing dome portions including the opening end, a thin-walled portion of which a thickness is smaller than other portions of each of the reinforcing dome portions,
  the step (i) is a step of forming the thin-walled portion by reducing an amount of resin at the other end of each of the reinforcing dome portions,
  the step (b) includes
    a first step of winding resin-impregnated fiber on a mandrel, and
    a second step of curing resin of the resin-impregnated fiber wound on the mandrel, and
  the step (i) is a step of performing curing of the resin in the second step, in a state in which a rubber band is wound onto an outer side of the resin-impregnated fiber at a portion that serves as the other end of each of the reinforcing dome portions.

2. The method according to claim 1, wherein in the step (b), the reinforcing dome portions are formed such that a maximum outer diameter of each of the reinforcing dome portions is equal to or smaller than a maximum outer diameter of the reinforcing pipe portion.

3. The method according to claim 1, wherein the step (c) includes a step of coating resin on a portion that is a gap formed below the outer helical layer at a boundary between the reinforcing pipe portion and each of the reinforcing dome portions in the step (d).

* * * * *